Figure 1:
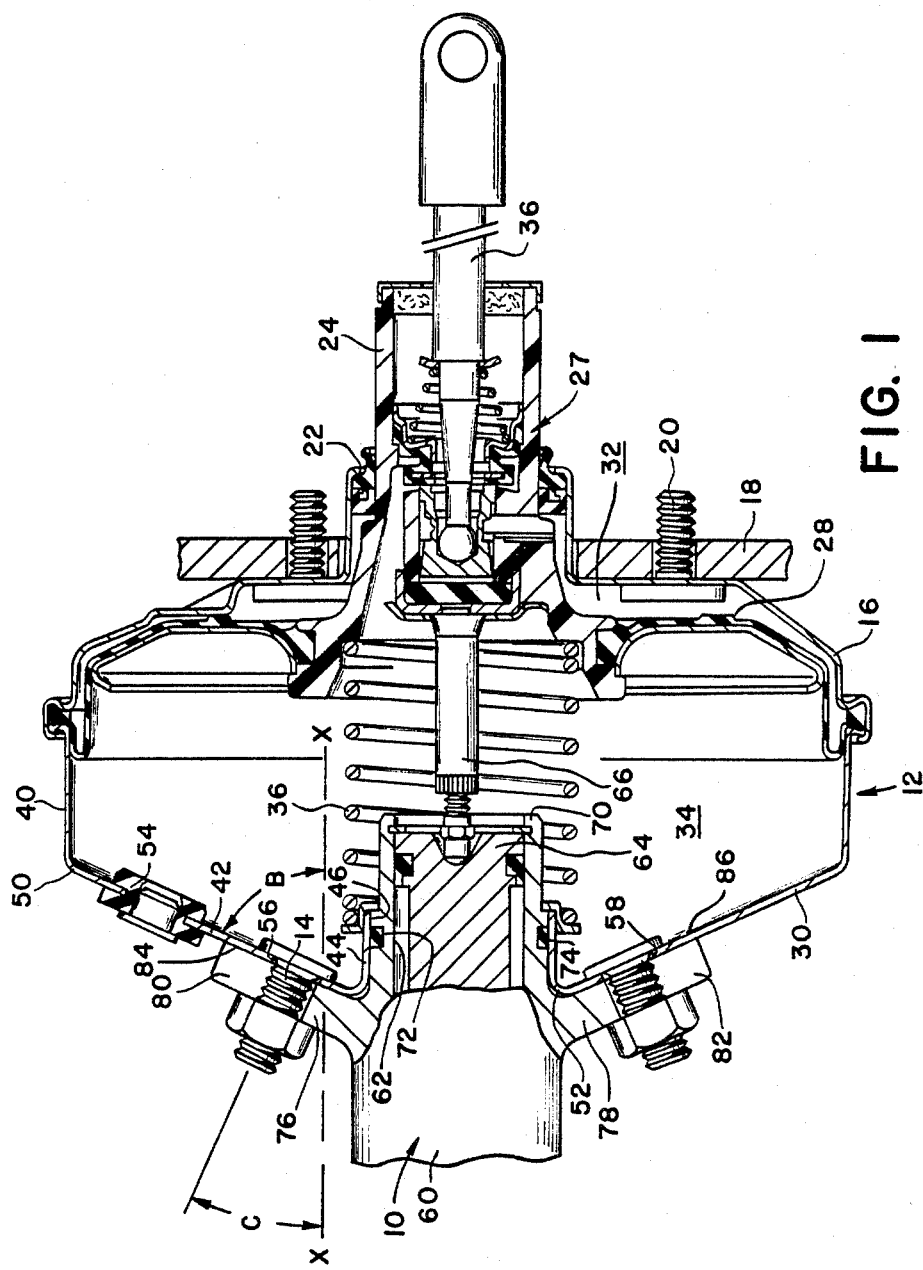

United States Patent [19]

Myers

[11] Patent Number: 4,785,628

[45] Date of Patent: Nov. 22, 1988

[54] MASTER CYLINDER AND VACUUM BRAKE BOOSTER

[75] Inventor: Lawrence R. Myers, South Bend, Ind.

[73] Assignee: Allied-Signal, Inc., Morristown, N.J.

[21] Appl. No.: 593,787

[22] Filed: Mar. 27, 1984

[51] Int. Cl.⁴ ............................................. B60T 13/00
[52] U.S. Cl. ..................................... 60/547.1; 92/169
[58] Field of Search ............................ 60/533, 547.1; 92/169.2, 169.3, 169.4, 128, 169; 248/27.1, 56; 403/337; 192/88 A

[56] References Cited

U.S. PATENT DOCUMENTS

| | | | |
|---|---|---|---|
| 1,526,336 | 2/1925 | Hart | 403/337 |
| 2,996,318 | 8/1961 | Gravert | 403/337 |
| 4,185,334 | 1/1980 | Izzi | 403/337 |
| 4,241,593 | 12/1980 | Matyl et al. | 403/337 |
| 4,271,750 | 6/1981 | Thomas et al. | 92/169.3 |
| 4,278,009 | 7/1981 | Demido | 91/47 |
| 4,353,291 | 12/1982 | Hauduc | 92/169.2 |

FOREIGN PATENT DOCUMENTS

| | | | |
|---|---|---|---|
| 2819466 | 11/1978 | Fed. Rep. of Germany . | |
| 167548 | 12/1981 | Japan | 92/169.3 |
| 2034430 | 6/1980 | United Kingdom . | |

Primary Examiner—Robert E. Garrett
Attorney, Agent, or Firm—Larry J. Palguta; Ken C. Decker

[57] ABSTRACT

A vacuum brake booster is provided with a front shell coupled to a master cylinder and a rear shell adapted for attachment to a vehicle fire wall. The front shell is provided with a unidirectional arcuate portion between radially inner and outer extremes in order to reduce the normal force imparted to the front shell during braking and thereby reduce deflection.

4 Claims, 2 Drawing Sheets

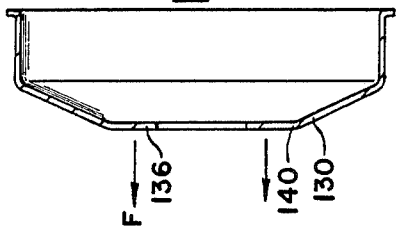
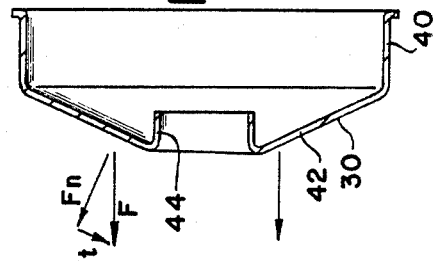
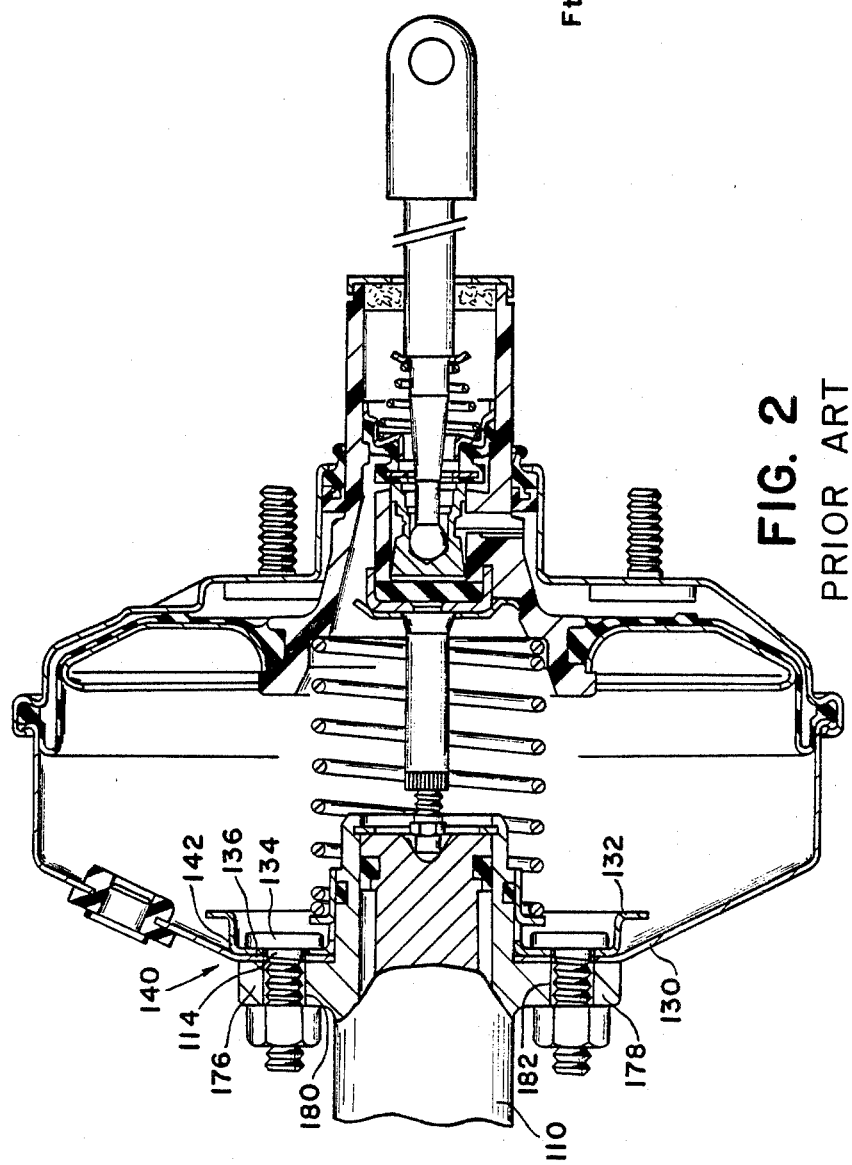

MASTER CYLINDER AND VACUUM BRAKE BOOSTER

This invention relates to a master cylinder and vacuum brake booster wherein a rear shell for the vacuum brake booster is adapted for attachment to a vehicle fire wall and a front shell for the vacuum brake booster is coupled to the master cylinder to carry the latter.

It is known that a vacuum brake booster can be made from thin light weight shells having a thickness equal to about 0.030 inches. These thin light weight shells reduce weight for the vacuum brake booster so that a vehicle equipped with the vacuum brake booster will be lighter in weight and therefore more efficient in its consumption of fuel. With a thin light weight shell for the front shell it is necessary to use a reinforcement plate at the location of attachment for the master cylinder to prevent concentration of stresses during braking. Moreover, the front shell is formed with a flat laterally extending portion to accomodate laterally extending flanges on the master cylinder. As a result, the front shell includes a circumferential edge where the front shell changes direction adjacent the master cylinder flange and the stresses imparted to the front shell during braking are concentrated.

The present invention provides a front shell designed to avoid concentration of stresses and a master cylinder adapted for attachment to such a front shell. To this end, the present invention comprises a master cylinder and vacuum brake booster wherein a rear shell for the booster is disposed adjacent a vehicle fire wall and a front shell for the booster is adapted to carry the master cylinder, the booster being pressure responsive to generate an input force to assist operation of the master cylinder during braking, the master cylinder including a flange adjacent the front shell and cooperating with a bolt or the like to secure the master cylinder to the front shell, characterized in that said front shell extends from a radial inner portion to an axially-extruding radial outer portion to define a substantially unidirectional frusto-conical profile from said inner portion to said outer portion, said master cylinder flange including a substantially tapered surface matching said profile and said bolt defining a longitudinal axis which intersects a longitudinal axis for said master cylinder and vacuum brake booster when said bolt secures said master cylinder to said front shell whereby said front shell uniformly distributes reaction forces generated during braking.

It is an advantage of the present invention that the front shell can be used to support a master cylinder in the absence of a reinforcement plate. In addition with the design of the present invention, the front shell is exposed to both a normal load and a tangential load during braking, rather than only a normal load as taught by the prior art.

In the drawings, FIG. 1 is a top cross sectional view of a master cylinder and vacuum brake booster coupled together; FIG. 2 is a partial view similar to FIG. 1 showing a prior art master cylinder and vacuum brake booster; and FIGS. 3a and 3b are force diagrams for the front shells of different vacuum brake boosters.

A master cylinder 10 is coupled to a vacuum brake booster 12 via bolts 14. The vacuum brake booster 12 includes a rear shell 16 coupled to a vehicle fire wall 18 by means of studs 20. An opening 22 in the rear shell 16 receives a valve body 24 to cooperate with a valve assembly 27 in a conventional manner. A diaphragm 28 extends outwardly from the valve body 24 for fixation between the rear shell 16 and a front shell 30. The diaphragm 28 separates a rear chamber 32 from a front chamber 34 so that a pressure differential is established across the diaphragm in response to operation of the valve assembly 27 during braking. A resilient member 36 extends from the front shell 30 to the valve body 24 to bias the latter to its rest position.

The front shell 30 includes a radial outer axially extending portion 40 connected via suitable means with the rear shell 16, a substantially unidirectional and slightly arcuate portion 42 with a frusto-conical profile, and a radial inner axially extending portion 44 forming an opening 46. The portion 42 is concave facing outwardly from the vacuum brake booster. As shown, the portion 42 is relatively unidirectonal from an outer edge 50 adjoining portion 40 to an inner edge 52 adjoining the portion 44. The front shell 30 is provided with a second opening 54 adapted to receive a check valve or the like in communication with a vacuum source, a third opening 56 receiving one bolt 14, and a fourth opening 58 receiving another bolt 14.

The master cylinder 10 includes a housing 60 with a bore 62 therein receiving at least one piston shown schematically at 64. The piston 64 abuts an output rod 66 of the vacuum brake booster and cooperates with the housing to form a pressure chamber (not shown) communicating with a brake assembly. The bore 62 leads to an open end 70 of the housing 60. An outer recess 72 on the open end carries a seal 74 engaging the front shell portion 44 when the end 70 is disposed in the opening 46. The housing includes a pair of flanges 76 and 78 adjacent the recess 72. Each flange is provided with a slot 80 and 82, respectively to receive a corresponding bolt 14. Each flange extends angularly relative to a vertical axis to define inner surfaces 84 and 86, respectively, identical in profile to the portion 42 of the front shell 30. As a result the inner surfaces 84 and 86 and the portion 42 both form an angle B relative to a horizontal axis X—X. In addition, the bolts 14 are angularly disposed relative to the horizontal axis to form an angle C between a longitudinal axis for the bolt and the axis X—X. Preferably the angle B is about 60° and the angle C is about 30°.

Turning to FIG. 2, the prior art teaches a thin wall construction for a front shell 130 with a reinforcement plate 132 captured between a head 134 of bolt 114 and a transversely extending portion 136 of front shell 130. The master cylinder 110 forms flanges 176 and 178 extending transversely in the same direction as the portion 136 so that the bolts 114 extend longitudinally in a parallel relation to a bore 162 of master cylinder 110 and through openings 180 and 182 in the flanges 176 and 178, respectively. With the front shell forming the transversely extending portion 136 adjacent a slanted portion 138 an edge 140 is formed near an edge 142 of the reinforcement plate.

Turning to FIGS. 3a and 3b the application forces are shown for a thin wall front shell in a prior art shell 130 and the shell 30 of the present invention. With equal forces F applied to the front shells via the respective mounting bolts 114 and 14, the force F applied to the front shell 30 includes a normal component $F_N$ and a tangential component $F_T$ whereas the force F applied to the front shell 130 includes a normal component equal to F. In the front shells of vacuum brake boosters the forces causing the most deflection and highest stress are those forces normal to the shell, as these normal forces impart bending to the front shell. This is especially critical at the location of attachment between the master cylinder and the front shell. As shown in FIGS. 3a and 3b the force F in the axial direction for both shells 30 and 130 is the same; however, the normal force $F_N$ for shell 30 is equal to FcosC while $F_N$ for shell 130 is equal to F. Consequently, with the angular unidirectional portion 42 it is possible to reduce the normal force applied to the front shell 30, thereby reducing deflection. Accordingly, the master cylinder flanges 76 and 78 are angularly disposed to match portion 42.

In an alternative embodiment, not shown, the portion 42 could be recessed within the axially extending radial outer portion 40 to compactly nestle the master cylinder adjacent the vacuum brake booster. As a result, the portion 42 would extend toward the rear shell in a radially inward direction for the alternative embodiment.

I claim:

1. A master cylinder and vacuum brake booster wherein a rear shell for the booster is disposed adjacent a vehicle fire wall and a front shell for the booster is adapted carry the master cylinder, the booster including a diaphragm which is pressure responsive to generate an input force to assist operation of the master cylinder during braking, the master cylinder including a flange adjacent the front shell and cooperating with a bolt or the like to secure the master cylinder to the front shell so that reaction forces opposing the input force are transmitted from the master cylinder to the front shell, characterized in that said front shell extends from a radial inner portion to an axially-extending radial outer portion to define a substantially unidirectional and substantially frusto-conical uniform profile from said inner portion to said outer portion, said master cylinder flange including a substantially tapered surface matching said profile and said bolt defining a longitudinal axis which intersects a longitudinal axis for said master cylinder and vacuum brake booster when said bolt secures said master cylinder to said front shell so that said front shell uniformly distributes the reaction forces over said front shell during braking.

2. The master cylinder and vacuum brake booster of claim 1 in which said flange is provided with a slot receiving said bolt, and said slot opens in a radial direction away from said master cylinder.

3. The master cylinder and vacuum brake booster of claim 1 in which said radial inner portion includes an axially extending leg cooperating with said profile adjacent said radial inner portion to form an angle of about 60°.

4. The master cylinder and vacuum brake booster of claim 1 in which said bolt terminates in a head spaced from the diaphragm and directly engageable with one side of said front shell and said master cylinder flange is directly engageable with another side of said front shell so that said front shell is supported between said head and said flange in the absence of further parts.

* * * * *